May 11, 1926.
J. H. CARRIER
LEVEL
Filed April 18, 1924
1,583,957
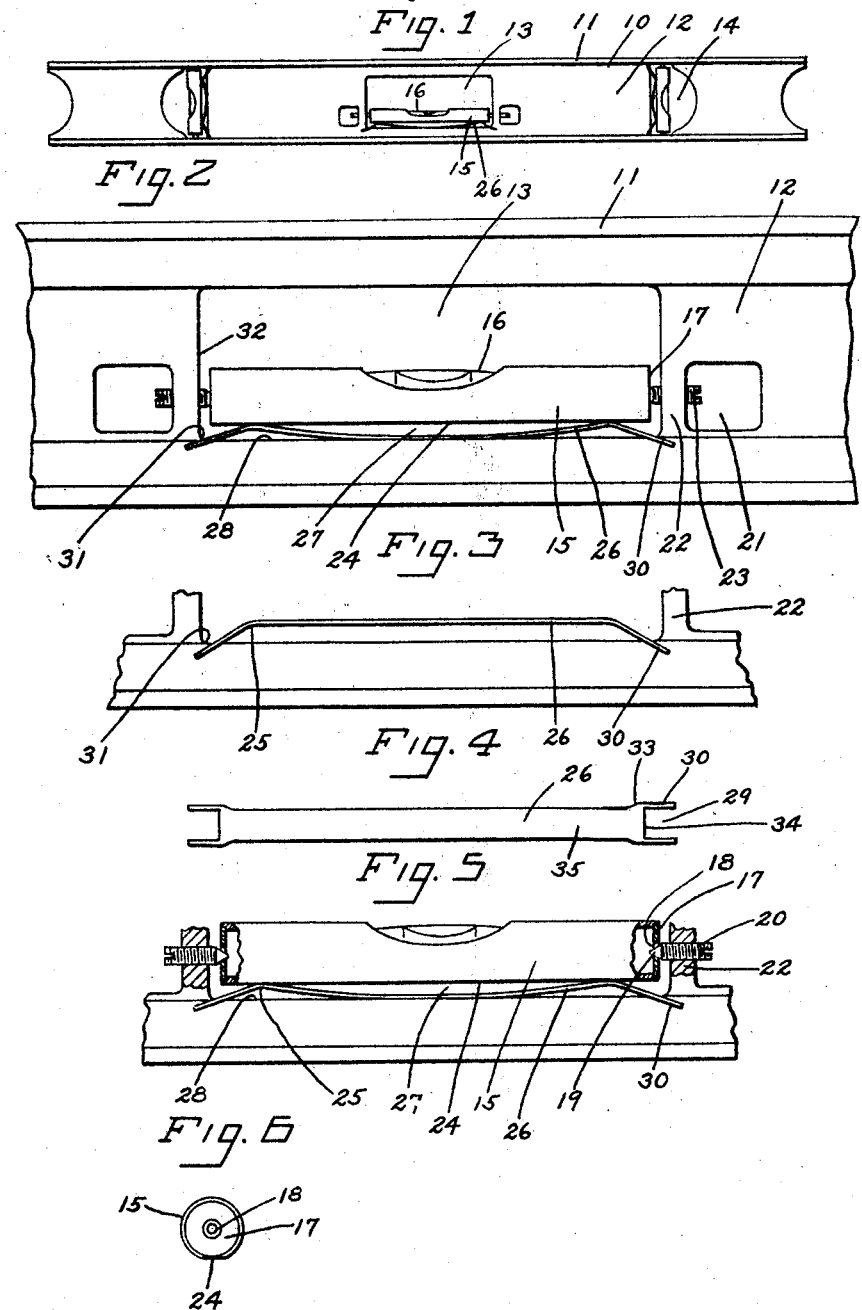
Inventor
John H. Carrier.
By Louis M. Schmidt.
Atty.

Patented May 11, 1926.

1,583,957

UNITED STATES PATENT OFFICE.

JOHN H. CARRIER, OF NEW BRITAIN, CONNECTICUT.

LEVEL.

Application filed April 18, 1924. Serial No. 707,340.

My invention relates to improvements in levels of the form having an indicating device in the form of glass vial or bubble tube, housed in a tubular casing, that is supported in an elongated body or stock, and the object of my improvement is to provide means that are convenient and efficient for adjusting the casing relatively to the stock to obtain the desired accuracy under conditions of use.

In the accompanying drawing:—

Figure 1 is a side elevation of my improved level.

Figure 2 is a similar view on an enlarged scale of the middle portion, showing the level vial proper and the adjacent parts, as distinguished from the plumb vials that are located adjacent the ends.

Figure 3 is a similar fragmentary view with the level vial and casing therefor removed, showing the pressure spring in place.

Figure 4 is a plan view of the spring.

Figure 5 is a fragmentary view, in part broken away, showing the details of the adjusting screws and the receiving sockets therefor in the ends of the casing for the vial.

Figure 6 is an end elevation of the casing for the vial.

My improved level comprises a stock or body 10 of metal of I-beam form of cross-section, having relatively heavy top and bottom portions 11 that are cross-connected by a web 12. Openings are provided in the web 12 for the vials or bubble glasses and the tubular housings or casings therefor comprising the opening 13 at the middle for the level indicating devices and the openings 14 adjacent the ends for the plumb devices.

The plumb devices are generally similar to the level devices and differ therefrom in such details as size and the particular arrangement as to the supporting and adjusting screws for the tubular casings. The principles that pertain to the present invention are the same in the two so that the details of the features having novelty need be considered for one only. The construction involved in the devices for adjusting the tubular casing or housing 15 for vial or bubble glass 16 for the usual uses as a level will now be considered.

The casing 15 is of elongated tubular form, having the ends closed by an end wall 17, and is positioned in the middle opening 13 and adjacent the lower portion thereof and so as to be substantially symmetrical with respect to the web 12. The end walls 17 are provided each with a tapered hole 18 for cooperating with the tapered end 19 of a supporting and adjusting screw 20.

Said screws 20 are supported by the material of the web 12, which is of appreciable thickness. To provide for access to the screws 20 the web 12 is further cut away as shown at 21 in the form of diminutive windows or openings that are separated from the middle larger opening 13 by a vertical bridge or partition wall 22. The screws 20 are preferably headless screws, they extend through the partition wall 22 in each case so that the outer end 23 projects into the open space of the diminutive opening 21.

The details as to the tapered holes 18 and the pointed screws 20 are such that there is slight though appreciable leeway between the walls of the said hole 18 and the cooperating contacting point 19 of the screw 20 whereby as the screw is moved inwardly or outwardly there is a corresponding tendency to lower or raise the corresponding end of the casing 15. The two screws 20 would be operated upon simultaneously and when in the final holding positions would preferably be set somewhat firmly so as to ensure the parts retaining the particular position to which they may have been set.

The present invention pertains particularly to the means that are provided for cooperating with the supporting and adjusting screws 20, which means involve the use of spring pressure as applied to the under side of the casing. As shown, the casing 15 has the under side 24 flattened and in use said casing is subjected to spring pressure at two spring contacting points 25 adjacent the ends and at the flat face of the under side 24, the tendency of which pressure is to elevate the said ends and to effect forcible contact with the screws 20. By providing sufficient spring pressure the parts can be snugly and reliably adjusted.

In some cases a single contact spring pressure may be used, with the spring contact adjacent the middle of the casing, but a more effective and reliable result is attained by applying the spring pressure at two points, one on each side of the middle and each near one of the ends.

The details as to the spring will now be considered, involving the use of a single spring 26 of flat spring material and adapted to effect operative contact at the two contacting points 25 that are appreciably separated. The spring 26 is located generally in the space 27 between the flattened bottom face 24 of the casing 15 and the bottom border edge 28 of the opening 13. The ends of the spring 26 are forked, comprising an opening or recess 29 that is bordered by the side fingers 30, the said recess 29 being such as to provide an operative fit for the material of the web 12 at the corner 31 of the opening 13 formed by the lower border edge 28 and the edge 32 at each end of said opening 13. The forked ends 33 described are seated in the corners 31, the end walls 34 of the recess 29 making contact in each case.

The body portion 35 of the spring 26 intermediate the two end walls 34, is somewhat longer than the opening 13 so that in the position described the spring will assume a curved form. With the casing omitted the spring will assume the form or an arch, having one continuous bend. When the casing 15 is in the position for use, however, the spring will make contact at the two points substantially as shown at 25 with the part of the spring intermediate said contacting points buckled downwardly and away from the opposed flat face 24 of the casing.

I claim as my invention:—

1. In a level, a body of elongated form having a transverse opening for an indicating device, a tubular casing for said device, said casing being positioned in said opening and in spaced relation to the bottom border edge thereof and having sockets in the ends, end walls of said opening being opposed to said ends of the casing, clamping screws being entered through the material of said end walls and engaged by their free ends with said sockets, and a spring housed within the space between said casing and border edge serving to cooperate with said screws for positioning said casing relatively to said body.

2. In a level as described in claim 1, said end walls meeting said bottom border edge of the opening to form border-corners, and the ends of said spring being forcibly engaged with said corners for holding the spring in place.

3. In a level as described in claim 1, said spring having forked ends for cooperating with the material of said body for holding in place.

4. In a level, a body having an opening that is bordered by end walls, a tubular casing for an indicating device having end faces that are opposed to said end walls and having diminutive bearing openings, supporting screws projecting from said end walls and engaging with said bearing openings, a bottom border wall connecting said end walls and separated from said tubular casing by a space, and spring means operatively housed in said space and engaging with said tubular casing for elevating the same in opposition to said screws.

JOHN H. CARRIER.